No. 802,901. PATENTED OCT. 24, 1905.
J. S. YABSLEY & R. C. ATKINSON.
APPARATUS FOR MEASURING THE FLOW OF LIQUIDS.
APPLICATION FILED AUG. 25, 1905.
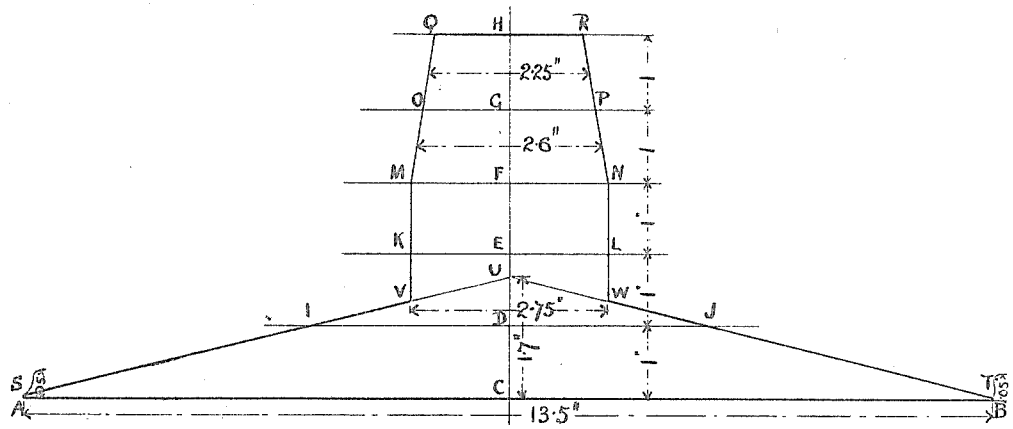
Fig. I
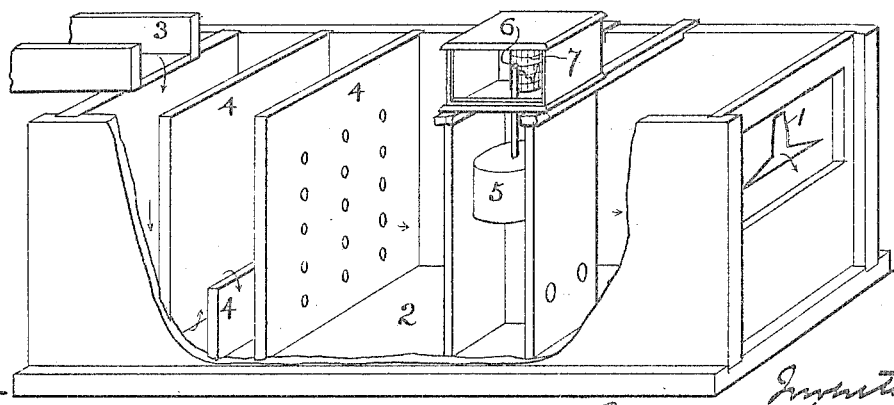
Fig. II

UNITED STATES PATENT OFFICE.

JAMES STEPHEN YABSLEY AND ROBERT CHARLES ATKINSON, OF JOHANNESBURG, TRANSVAAL.

APPARATUS FOR MEASURING THE FLOW OF LIQUIDS.

No. 802,901. Specification of Letters Patent. Patented Oct. 24, 1905.

Application filed August 25, 1905. Serial No. 275,699.

*To all whom it may concern:*

Be it known that we, JAMES STEPHEN YABSLEY and ROBERT CHARLES ATKINSON, British subjects, by profession engineers, residing at Johannesburg, in the Colony of the Transvaal, have invented certain new and useful Improvements in and relating to Apparatus for Measuring the Flow of Liquids, of which the following is a specification, reference being had therein to the accompanying drawings.

The present invention relates to apparatus for measuring the flow of liquids; and it consists, primarily, in weir-notches of such configuration that the quantity of water passed by them is at all times directly proportional within small and controllable limits to the head of liquid above the base of said notches.

The invention also consists of the combination, with such a weir-notch, of apparatus by which the quantity of water passing at any moment may be determined and by which a continuous record of the flow may be obtained.

In the accompanying drawings, Figure I is a diagram illustrating the method of setting out one example of the improved type of notch, and Fig. II is a perspective view of the complete indicating and recording apparatus.

The method of setting out a notch of the novel type is broadly as follows: A figure in the shape of a triangle with its apex cut off, forming a regular trapezoid, is first drawn corresponding to an aperture capable of passing with a depth of water equal to its own height a fraction—for example, one-fifth or one-twelfth of the maximum required from the notch—and preferably approximating roughly to the desired form—*i. e.*, having converging sides. The quantity of liquid which such aperture passes under the head specified is then determined conveniently by means of the known formula.

$$Q = A\, c\, \sqrt{2\, g\, h},$$

where Q equals cubic feet passed per second, A equals area of the aperture in square feet, $c$ equals coefficient of efficiency—*i. e.*, the fractional reduction of the flow by friction and contraction, which may be taken as .604—$g$ equals acceleration in feet per second due to gravity, $h$ equals head of water above the center of area of the aperture expressed in feet. The value of the expression $\frac{Q}{H}$, where H equals the perpendicular distance from the base of the discharge-aperture to the upper surface of the liquid, is now determined and used in the subsequent work as a constant, which may be denoted by M. This result having been obtained, the next step is to superimpose upon the top of the first figure a second figure, also having a flat or pointed top and of such contour that the value of the expression $\frac{Q}{H}$ for the whole figure thus formed will be equal to M, as found above. To this end any figure which experience suggests and fulfilling the first two conditions specified—viz., superimposition and flatness or angularity at the top—is drawn, and the quantity passed by an aperture similar to the whole figure thus formed, where the upper surface of the liquid is at the distance H from the bottom of the weir-notch, is determined, as for the first section of the aperture. Should the value of $\frac{Q}{H}$, obtained from this result, be equal to M, the figure is correct; but otherwise the sides of the second figure are so modified as to alter either or both the factors A and $h$ in the equation until a correct result is obtained. The third and subsequent steps consist in adding further additional figures one by one in the same manner as the second until the whole figure thus formed is that of an aperture of the desired maximum capacity. A notch similar to the figure and having the usual beveled edges is then cut out of sheet metal or other suitable material and fitted to a weir-box or otherwise applied for use, as may be desired.

Although it is to be understood that neither one fixed form nor specific dimensions is or are of the essence of the invention, broadly considered, yet since the production of a notch by this method is necessarily empirical and dependent for success upon experience the dimensioned diagram, Fig. I, of a notch having a capacity of one thousand tons of water per twenty-four hours is appended hereto in order to facilitate the carrying out of the invention by others. The notch in question gives accurate results with heads of one, two, three, four, and five inches. The error with any intermediate head in no instance exceed three per cent., and the average error throughout the whole range is for practical purposes *nil*.

It may here be remarked that while the sides of the figure need not be rectilinear nor the figure symmetrical about a vertical axis nor the several sections equal in height, yet such conditions facilitate the work and have been observed in designing the notch under discussion. In this instance a horizontal base-line A B was drawn and bisected at C, from which point a perpendicular C H was raised and stepped out in equal divisions C D, D E, E F, F G, G H. At these points of division horizontal lines I D J, K E L, and so on, were drawn. It was found to be advantageous to make the lowermost section with sharply-converging sides and also that the sharp corners so formed were undesirable, as causing undue contraction of the stream. Consequently perpendiculars A S, B T were erected at the extremities of A B and the points S T joined to a point U upon C H 1.7 inches above C. The area in square feet and the position of the center of area of figure A S I J T B were then found and the discharge with a one-inch head calculated.

Correct second and third sections—viz., I V K L W J and K M N L, respectively—were obtained by drawing perpendiculars V M and W N equidistant 1.375 inches from the axis C H, while further experiment and calculation following the method specified above gave the two last sections M O P N and O Q R P, respectively, having the dimensions indicated.

It will be at once understood that the approximation to accuracy may be made as close as desired by increasing the number, while decreasing the height of the several sections.

Having once obtained an accurate notch of any capacity by the method indicated, notches for different capacities may be readily deduced from it without repeating the construction by simply altering all lateral dimensions in the desired proportion.

A notch of the improved type is especially applicable for use with indicating and recording contrivances in which a float located in a weir-box actuates a pointer moving over a scale or a pen adapted to mark upon a moving chart. Hitherto when using a V-square or other known type of notch in conjunction with such apparatus it has been necessary to employ either a motion-rectifying device or scales or charts specially marked or divided with unequal divisions to correspond with the variations in value of the expression $\frac{Q}{H}$. With the novel notch, however, the value of such expression being constant, the scale or chart employed may be divided out into equal divisions, thus facilitating computation of a chart on the one hand or on the other simplifying the mechanism of the indicating and recording apparatus.

Fig. II illustrates the combination of the improved notch with a simple indicating and recording apparatus.

The notch 1 is formed in one end of a weir-box 2, into the opposite end of which the stream is delivered by a launder or pipe 3. Suitable baffles 4 4 are provided for the purpose of obtaining a level and slowly-moving body of water adjacent to the aperture. A float 5, suitably guided, carries a pen 6, adapted to mark upon a chart 7, moved at a uniform rate by clockwork. It is evident that where a record is not required the pen may be replaced by a pointer moving over a uniformly-divided scale and acting as an indicator of the amount flowing at any moment.

In preparing the above-described or any similar apparatus for use it is necessary to carefully set the aperture so that its base-line is perfectly level. Furthermore, to obtain a good suppression it has been found advisable to make the distance from the bottom of the box inside not less than two-thirds the length of the base-line of the aperture and the inside width of the box not less than double the same distance.

We claim as our invention—

1. In an apparatus for measuring the flow of liquids, a board or similar obstruction provided with a weir-notch, said notch being provided with a trapezoidal base and a number of imaginarily separate vertical sections, the lower ones having vertical sides and the upper ones having their sides inclined upwardly toward each other, substantially as described.

2. In an apparatus for measuring the flow of liquids, the combination of a board or other obstacle having a weir-notch therein, said notch being provided with a trapezoidal base and a number of imaginarily separate vertical sections, the lower ones having vertical sides and the upper ones having their sides inclined upwardly toward each other, a box containing said board, a float movable in unison with the level of the liquid in said box, and a recording device operated by said float, substantially as described.

3. In an apparatus for measuring the flow of liquids, the combination of a board or other obstacle having a weir-notch therein, said notch being provided with a trapezoidal base and a number of imaginarily separate vertical sections, the lower ones having vertical sides and the upper ones having their sides inclined upwardly toward each other, a box containing said board, a float movable in unison with the level of the liquid in said box, and an indicating device operated by said float, substantially as described.

In testimony whereof we affix our signatures in presence of two witnesses.

JAMES STEPHEN YABSLEY.
ROBERT CHARLES ATKINSON.

Witnesses:
HAROLD ERNEST KISCH,
WILLIAM HIELMAN VINCENT.